United States Patent [19]

Bacher et al.

[11] Patent Number: 4,744,941

[45] Date of Patent: May 17, 1988

[54] ANTISEISMIC PROTECTION DEVICE FOR SOLID BLOCKS

[75] Inventors: Pierre Bacher, Les Loges en Josas; Roger Gueraud, Maisons Alfort, both of France

[73] Assignee: Service National Electricite de France, Paris, France

[21] Appl. No.: 873,148

[22] Filed: Jun. 9, 1986

Related U.S. Application Data

[63] Continuation of Ser. No. 520,730, Aug. 5, 1983, abandoned.

[30] Foreign Application Priority Data

Aug. 13, 1982 [FR] France .................. 82 14086

[51] Int. Cl.$^4$ .................. G21C 9/00; G21C 13/00
[52] U.S. Cl. .................. 376/285; 376/293; 376/461; 52/167
[58] Field of Search ........... 376/285, 293, 294, 295, 376/461; 52/167, 224, 573, 249, 483, 480

[56] References Cited

U.S. PATENT DOCUMENTS

| | | |
|---|---|---|
| 2,055,000 | 9/1936 | Bacigalupo .................. 72/77 |
| 2,116,654 | 5/1938 | Barge .................. 52/480 X |
| 3,110,464 | 11/1963 | Baratoff et al. .................. 52/167 |
| 3,129,836 | 4/1964 | Frevel .................. 376/285 X |
| 3,232,015 | 2/1966 | Latham .................. 52/167 |
| 3,444,725 | 5/1969 | Chare .................. 376/293 X |
| 3,454,466 | 7/1969 | Pitt et al. .................. 376/293 X |
| 3,794,277 | 2/1974 | Smedley et al. .................. 52/167 X |
| 4,008,757 | 2/1977 | Weatherford, Jr. .................. 376/285 |
| 4,266,379 | 5/1981 | Valencia Aguilar .................. 52/167 X |
| 4,402,483 | 9/1983 | Kurabayashi et al. .................. 52/167 X |
| 4,460,539 | 7/1984 | Andro et al. .................. 376/285 |
| 4,581,199 | 4/1986 | Bioret et al. .................. 376/285 |

FOREIGN PATENT DOCUMENTS

| | | |
|---|---|---|
| 0094326 | 11/1983 | European Pat. Off. ............ 376/285 |
| 2628276 | 1/1977 | Fed. Rep. of Germany ........ 52/167 |
| 2903758 | 8/1980 | Fed. Rep. of Germany ........ 52/167 |
| 2221953 | 10/1974 | France . |
| 2285684 | 4/1976 | France . |
| 2418850 | 9/1979 | France . |
| 0039796 | 12/1975 | Japan .................. 376/285 |
| 514765 | 12/1971 | Switzerland . |
| 0591552 | 2/1978 | U.S.S.R. .................. 52/167 |
| 0605924 | 4/1978 | U.S.S.R. .................. 52/167 |

OTHER PUBLICATIONS

Protection of Nuclear Power Plants against Seism, Plichon et al., Nuc. Tech., vol. 49, Jul. 80, pp. 295-306.
Engineering Design for Earthquake Environments, I Mech E Conf. Publications, Nov. 78, pp. 1-10, 53-58, 91-100, 119-127, 193-205.
"Rubber Mounts Insulate Whole Reactor from 0.6 g Earthquakes", by David Smith, Nuclear Engineering International, vol. 22, No. 262, Sep. 1977, pp. 45-47.

Primary Examiner—Deborah L. Kyle
Assistant Examiner—Daniel Wasil

[57] ABSTRACT

Antiseismic support structure for the pile block of a fast neutron nuclear reactor.

It comprises a concrete covering slab resting on the reactor building structure. The vessel and components of the pile block are suspended on said slab in a well of said structure. The building rests on the ground by means of two superimposed floors, namely an upper floor and a lower floor. The two floors are separated from one another by elastic supports, permitting a horizontal oscillatory displacement with respect to one another with a view of filtering the horizontal components of the earthquake with respect to the vessel. These elastic supports are in particular fretted elastomer supports. The slab rests on the structure of the building by a series of elastic supports absorbing the vertical components of possible seismic waves and it is vertically guided in the well of the building by vertical guidance means preventing any horizontal displacement of said block relative to the building, under the action of the horizontal components of possible seismic waves.

4 Claims, 4 Drawing Sheets

ANTISEISMIC PROTECTION DEVICE FOR SOLID BLOCKS

This application is a continuation of application Ser. No. 520,730, filed Aug. 5, 1983, now abandoned.

BACKGROUND OF THE INVENTION

The present invention applies to the antiseismic protection of solid blocks, located in a building well and able to move with respect to the building if seismic waves arrive. It more particularly, but not exclusively, relates to an antiseismic supporting device for a pile block of a fast neutron nuclear reactor.

Nuclear reactors generally have to be protected against the prejudicial effects of earthquakes, which can produce more or less violent waves in the ground and whose horizontal and vertical components can, if no precautions are taken, have highly prejudicial, or even catastrophic effects on the devices used for supporting the pile block and on the different components thereof.

The present invention more particularly relates to fast neutron nuclear reactors, such as the French Superphénix reactor in Creys-Malville, in which the pile block is closed in its upper part by a concrete slab, which bears directly on the building of the reactor. In constructions of this type, the reactor vessel and the components of the pile block are suspended on said slab and extend into a well of the building structure.

In the case of the Creys-Malville Superphénix power station, the reactor building rests by its floor directly on the ground and is consequently subject to all the horizontal and vertical components thereof in the case of an earthquake. In order to improve this, it has already been proposed (EDF - SPIE Batignolles French Patent No. EN 75/20654 of 1.7.1975) that the reactor buildings be placed on fretted elastomer supports in order to reduce the effects of the horizontal components of seismic shocks. This method has already been used by Electricite de France for the pressurized water nuclear reactor in Cruas and, combined with sliding plates, in the pressurized water nuclear power station in Koeberg, South Africa.

These supports, which have a very considerable transverse flexibility, act in the horizontal plane in a manner of a filter, which only permits the passage of the frequency to which it is tuned. As the other frequencies have been eliminated, there is no longer any amplification of the movements of the oscillating path of the construction, which are then solely subject to the acceleration given by the spectrum of the ground for the tuning frequency.

The interest of such supports having a limited horizontal rigidity, but a high vertical rigidity, is to largely uncouple the horizontal vibration modes from the vertical vibration modes, so that in the case of horizontal excitation, the complete building virtually behaves as an oscillator with a single degree of freedom, which gives a horizontal translation movement which, in itself, absorbs 98% of the energy and almost completely eliminates the rocking movements. However, although the reduction in the stresses due to the horizontal components of the earthquake is spectacular, this device does not make it possible to reduce the influence of the vertical component.

In general, vertical stresses are less prejudicial (they only constitute a supplementary percentage to be added to the gravity) and it is easier to adapt thereto.

In the special case of fast neutron reactors, for which the pile block is suspended on the slab, the aforementioned procedures may in certain cases prove inadequate, because such reactors are very sensitive to vertical stresses.

SUMMARY OF THE INVENTION

The present invention relates to an antiseismic support structure making it possible to more completely overcome that in the prior art described hereinbefore the harmful effect of horizontal and vertical components of seismic waves.

In the special case of a pile block of a fast neutron nuclear reactor, said antiseismic support structure comprises in per se known manner, a concrete covering slab resting on the structure of the reactor building and in which the vessel and the components of the pile block are suspended in a well of said structure, whereby the building rests on the ground by means of two superimposed floors, namely an upper floor and a lower floor, in which the two floors are separated from one another by elastic supports, particularly fretted elastomer supports. The antiseismic support structure is characterized in that the assembly of the pile blocks rests on the structure by a series of elastic supports, which absorb the vertical components of possible seismic waves, and in that it is vertically guided in the building well by vertical guidance means preventing any horizontal displacement or rocking of said block relative to the building under the action of the horizontal components of these same seismic waves.

Thus, as it is difficult to envisage supports which can both filter the horizontal components and the vertical components of the earthquake without any risk of having a significant rocking of the building, the structure according to the invention, makes it possible to minimize the horizontal stresses for the complete building and the equipment contained therein, while reducing the vertical stresses solely for the pile block and its components (pump, exchangers), which are the most sensitive points.

Thus, the structure according to the invention combines three means for combatting the harmful effects of seismic shocks.

The first of these means consists of placing the reactor building on supports, which are either elastic, or electroplastic, or elastic associated with sliding means in order to obtain, when appropriate, an oscillatory translation movement of the complete building in the horizontal plane, without any corresponding rocking, which could impart very dangerous pendulum-like movements to the pile block. The effect of these elastic supports is to filter, with respect to the vessel, the horizontal components of the earthquake. They are optionally supplemented by viscous absorbers.

According to a special construction according to the invention, the reactor building rests on the ground by means of two superimposed floors, which are separated from one another by elastic supports, such as e.g. fretted elastomer supports.

The second means used in the structure according to the invention consists of a series of elastic supports, which absorb the vertical components of the seismic waves and which are placed between the pile block assembly and the building structure. This series of elastic supports consequently supports the components of the pile block and is optionally supplemented by viscous absorbers, which filter the effects of an earthquake in the vertical direction.

Finally, the third protection means consists of vertical guidance means, such as e.g. fretted elastomer plates, which are positioned between the pile block and the wall of the building, and which act as vertical guides for preventing any horizontal dynamic displacement, as well as any rocking of the pile block with respect to the remainder of the building, so that within the horizontal plane, the pile block has to follow the movement of the building.

According to a first embodiment of the support structure according to the invention, the series of elastic supports is positioned between the upper floor and the bottom of the concrete cylindrical structure of the pile block, while the guidance means are distributed along the building well between the top and bottom thereof.

In a second embodiment of the support structure according to the invention, the elastic supports and the guidance means are located at the actual covering slab, namely between the latter and the upper part of the building well.

Moreover, this guidance system permits the free thermal expansion of the slab, which, in a subsidiary but very important manner, makes it possible to particularly simply solve the problems of the design of said slab, no matter whether it is fixed or suspended.

BRIEF DESCRIPTION OF THE DRAWINGS

The invention is described in greater detail hereinafter relative to non-limitative embodiments and with reference to the attached drawings, wherein show.

DETAILED DESCRIPTION OF THE INVENTION

Figure 1:
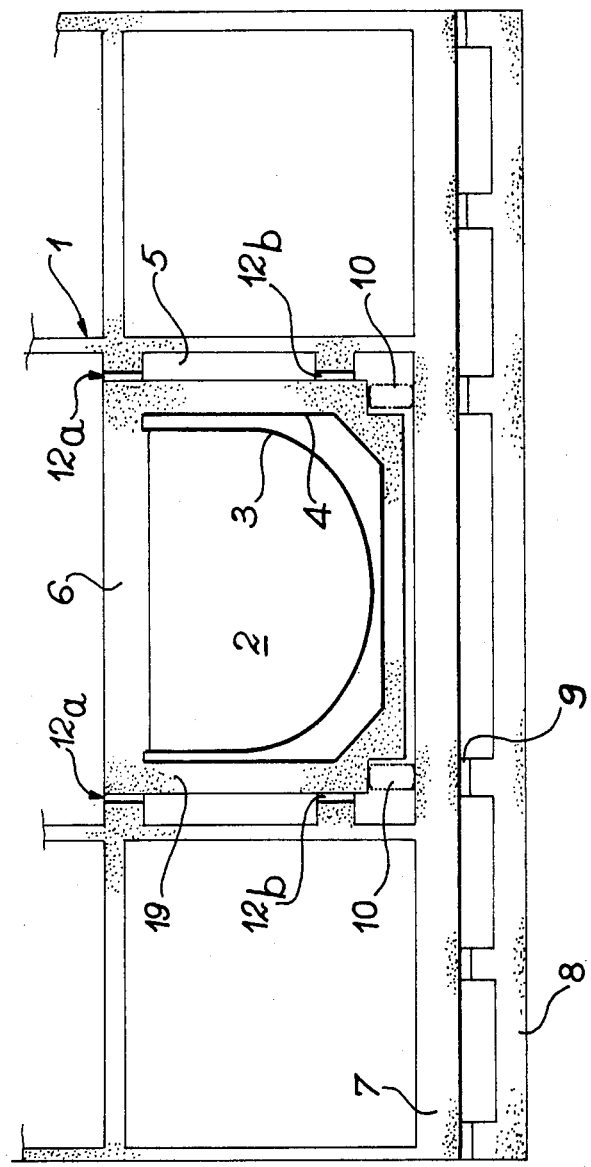
FIG. 1 a sectional elevation view of the building of a fast neutron nuclear reactor equipped with the structure according to the invention, in its first embodiment.

FIG. 1 shows a building 1 of a fast neutron nuclear reactor, whose pile block 2 comprises a main vessel 3 and a safety vessel 4 in a well 5 of building 1. Pile block 2 and vessel 3 of the reactor are sealed in conventional manner by a concrete slab 6. In the lower part of building 1 are provided two floors, namely an upper floor 7 and a lower floor 8, separated from one another by elastic supports 9 made from fretted elastomer. These supports 9 permit an oscillatory horizontal displacement, with return to the initial position, of the upper part of building 1 with respect to the lower floor 8, which can be very useful for absorbing seismic shocks having horizontal components of a certain magnitude.

Pile block 2 rests on building 1 in the following way. A lateral cylindrical concrete structure 19 integral with and peripherally and terminally extending the slab of reactor 6, serves as a support for pile block 2, via the series of elastic supports 10 placed between the bottom of cylindrical structure 19 and upper floor 7. In this embodiment, the vertical guidance means 12 are laterally distributed between supports 12a in the upper part and supports 12b in the lower part of block 2. The guidance means 12 are rigid in the horizontal plane and flexible in the vertical plane. The distribution of the vertical guidance means of the reactor block in well 5 between the top and bottom thereof makes it possible to completely prevent any rocking or oscillation of the reactor block assembly in the case of seismic shocks.

The structure operates in the following way:

the horizontal movement of the assembly is imposed by paraseismic supports 9 positioned beneath building 1;

the vertical movement of reactor block 2 is regulated by the characteristics of the elastic supports and absorbers 10;

the overall vertical movement of the remainder of buidling 1 is a function of its natural frequencies, which are dependent on the characteristics of the ground.

The building of reactor 1 and the reactor block 2 are connected by pipes, cables, etc., which must have sufficient flexibility to accept the vertical differential movements occurring, in the case of an earthquake, between these two parts.

Figure 2:
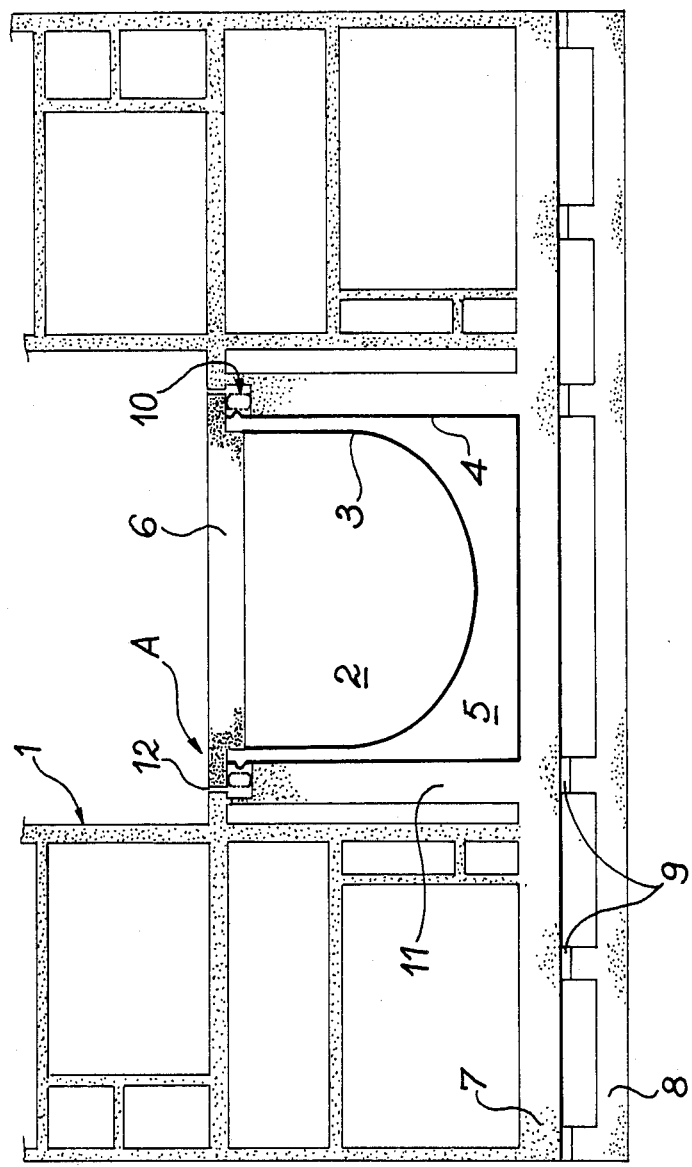
FIG. 2 a sectional elevation of a fast neutron nuclear reactor building equipped with the structure according to the invention in its second embodiment.

FIG. 2 shows the second embodiment of the support structure according to the invention and has, with the same reference numerals, most of the components of the embodiment of FIG. 1. However, in this embodiment, the elastic supports 10 and guidance means 12 are positioned at the coupling slab 6 in the following way.

According to the invention the absorbing elastic supports 10 are positioned between the upper ends of slab 6 and the vertical concrete caisson 11 directly surrounding the pile block 2. These absorber means make it possible to absorb the vertical components of a possible seismic wave, by preventing the rocking of the reactor vessel 3 with respect to building 1.

The vertical elastic guidance means 12, positioned vertically between the peripheral ends of reactor slab 6 and the structures of building 1, enable pile block 2 to be guided in well 5 in a vertical direction, while preventing any horizontal displacement of block 2, as well as any rocking thereof under the effect of the horizontal components of a possible seismic wave, because it is then substantially integral with building 1.

Figure 3:
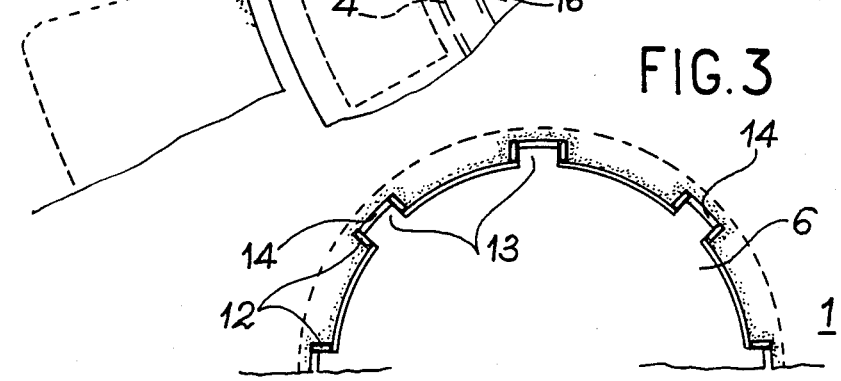
FIG. 3 a plan view of the slab of the reactor of FIG. 2.

FIG. 3 is a plan view of reactor slab 6, which is peripherally provided with a certain number of support tenons, such as 13, which cooperate with mortises 14, cut from the concrete of the building of reactor 1, so as to laterally enclose the vertical elastic guidance means 12, preventing any horizontal rotation of slab 6 with respect to the building 1, under the effect of the horizontal component of a seismic wave.

Figure 4:
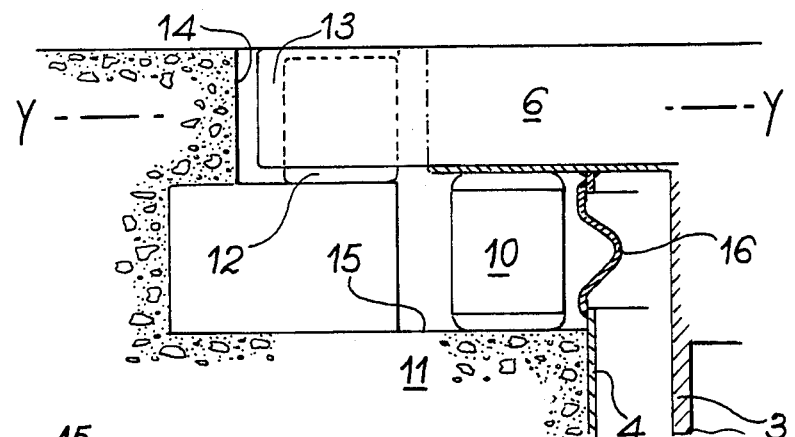
FIG. 4 a larger-scale sectional view according to line X—X in FIG. 5 of detail A of the upper end of the slab of the reactor of FIG. 2.
Figure 5:
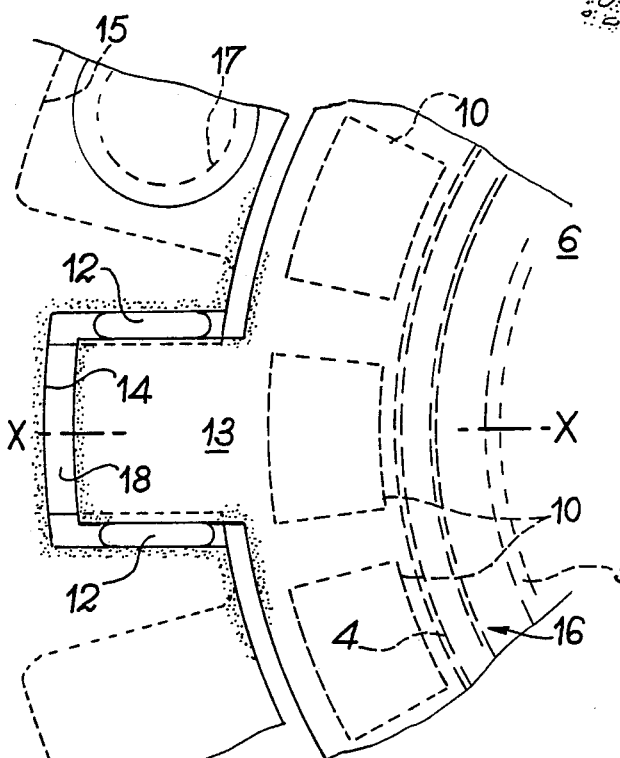
FIG. 5 a sectional plan view along line Y—Y of FIG. 4.

The constructional detail of the sector surrounded by a circle and designated A in FIG. 2 is shown in FIGS. 4 and 5, where it is possible to see the main components referred to hereinbefore and, in addition, the circular gallery 15 positioned beneath slab 6 and more particularly giving access to the first elastic support 10 and to the flexible tight joints 16, which obviate any leaks of radioactive material coming from the main vessel 3 and towards the outside thereof. Manholes 17, distributed over the periphery of the installation, permit the introduction of the individuals necessary for the different manipulations and the like in said gallery 15. FIG. 4 shows at 10, the elastic supports for absorbing the vertical components and the elastic guidance means 12, positioned vertically between tenons 13 and mortises 14, belonging respectively to slab 6 and to the concrete of reactor building 1. The guidance means 12 are rigid in the horizontal direction (in order to permit the displacement of slab 6 by building 1) and flexible in their vertical parallel planes (to permit the freedom of vertical movement of vessel 3). Between tenon 13 and mortise 14, there is a space forming an expansion joint 18 permitting, when the reactor temperature rises, the radial expansion of the slab. This arrangement, which is a consequence of the existence of tenons 13 and mortises 14 is very interesting, because it very simply solves the hitherto difficultly solvable problem of the radial expansion of the vessel and the slab supporting the same.

Thus, by associating the three means constituted by supports 9, 10 and 12, it is possible to obtain a maximum, effective protection against the seismic wave of a certain magnitude, no matter whether their components are mainly horizontal or vertical.

The antiseismic support structure according to the invention thus provides a double horizontal and vertical filtering of the seismic stresses, which considerably reduce the acceleration to which the slab and the components of the pile block are exposed in the case of an earthquake. Thus, it permits a simplified and much less costly construction than those available hitherto.

Moreover, this structure very simply permits the construction of the system oscillating with three degrees of freedom (2 horizontal and one vertical), whose rigidity and absorbing or damping characteristics are accurately known. Thus, there is a very good knowledge of the dynamic response in the case of a shock, which is also very satisfactory from the reactor safety standpoint.

Figure 6:
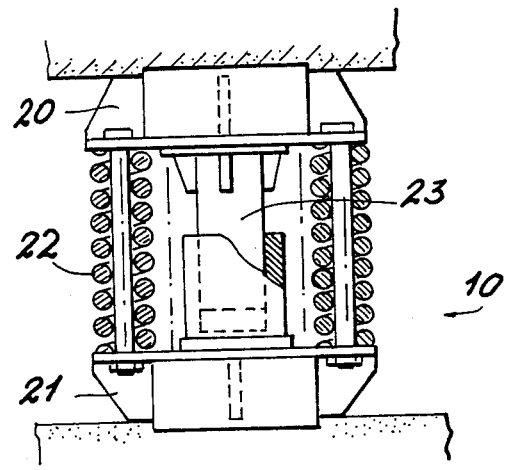
FIG. 6 a sectional view of a viscoelastic absorber for the vertical components of the seismic waves.

FIG. 6 shows in greater detail the absorber 10 of FIG. 1. This viscoelastic absorber 10 has between its ends 20, 21, a series of springs 22 and a viscous absorber 23. This association makes it possible to increase the filtering qualities of the vertical component of a seismic shock, above a frequency of approximately 1 to 1.7 Hz.

Figure 7:
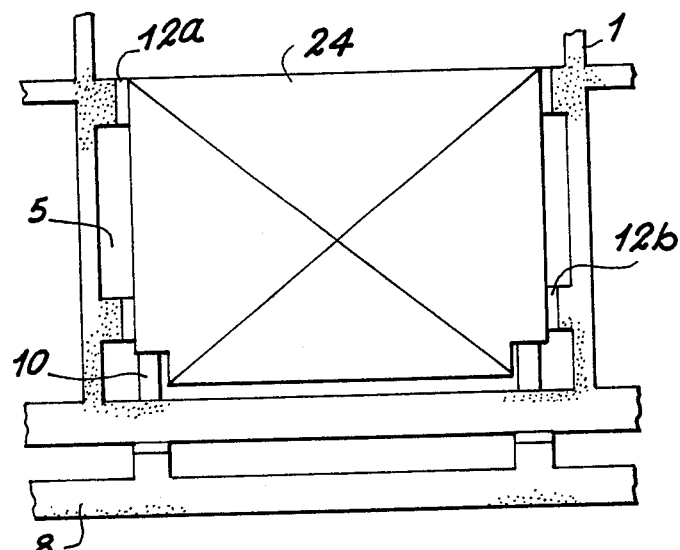
FIG. 7 an embodiment of the invention used in the protection of a solid block used in building construction.

FIG. 7 diagrammatically shows the application of the invention to the seismic protection of a solid block 24, such as exists in buildings. As a result of the means according to the invention and which carry the same references as in FIG. 1, this block is stabilized and is protected against rocking or oscillating movements through the double filtering of the horizontal and vertical components above approximately 1 Hz.

What is claimed is:

1. An antiseismic support structure for a pile block in a building well having a top and a bottom, said pile block containing a reactor vessel of a nuclear reactor and having a top and a bottom, said support structure comprising: a first floor supporting said building well; a second floor below said first floor; elastic support means separating said first and second floor for permitting a horizontal oscillatory displacement of one floor relative to the other to filter horizontal components of an earthquake with respect to the pile block; a series of elastic, absorbing supports between the bottom of said pile block and said first floor, for filtering vertical components of seismic waves; and a plurality of vertical guiding means between said building well and said pile block and arranged between the top and bottom of the building well, said vertical guiding means being horizontally rigid for preventing horizontal displacement and rocking of said pile block relative to said building well under the action of horizontal components of seismic waves, said vertical guiding means being vertically flexible for permitting and guiding a relative vertical movement between the pile block and the building well during a seismic occurrence.

2. A support structure according to claim 1, wherein the elastic absorbing supports comprise viscous absorbing means.

3. An antiseismic support structure for a pile block in a building well having a top and a bottom, said pile block containing a reactor vessel of a nuclear reactor and having a top and a bottom, said support structure comprising: a first floor supporting said building; a second floor below said first floor; elastic support means separating said first and second floor for permitting a horizontal oscillatory displacemnt of one floor relative to the other to filter horizontal components of an earthquake with respect to the pile block; a series of elastic, absorbing supports between the top of said pile block and the top of said building well, for filtering vertical components of seismic waves; and a plurality of vertical guiding means between said building well and said pile block and arranged between the top and bottom of the building well, said vertical guiding means being horizontally rigid for preventing horizontal displacement and rocking of said pile block relative to said building well under the action of horizontal components of seismic waves, said vertical guiding means being vertically flexible for permitting and guiding a relative vertical movement between the pile block and the building well during a seismic occurrence.

4. A support structure according to claim 3, wherein the elastic absorbing supports comprise viscous absorbing means.

* * * * *